(12) United States Patent
Elsässer et al.

(10) Patent No.: US 8,991,366 B2
(45) Date of Patent: Mar. 31, 2015

(54) FRESH AIR SYSTEM

(75) Inventors: Alfred Elsässer, Keltern (DE); Achim Gommel, Simmozheim (DE); Marco Warth, Schorndorf (DE)

(73) Assignee: Mahle International GmbH (GB)

( * ) Notice: Subject to any disclaimer, the term of this patent is extended or adjusted under 35 U.S.C. 154(b) by 1065 days.

(21) Appl. No.: 13/054,370

(22) PCT Filed: Jul. 13, 2009

(86) PCT No.: PCT/EP2009/058927
§ 371 (c)(1),
(2), (4) Date: Apr. 8, 2011

(87) PCT Pub. No.: WO2010/007024

PCT Pub. Date: Jan. 21, 2010

(65) Prior Publication Data
US 2011/0180049 A1    Jul. 28, 2011

(30) Foreign Application Priority Data

Jul. 18, 2008 (DE) .......................... 10 2008 033 885
Sep. 10, 2008 (DE) .......................... 10 2008 046 596

(51) Int. Cl.
*F02M 25/07* (2006.01)
*F02M 35/10* (2006.01)
(Continued)

(52) U.S. Cl.
CPC .......... *F02M 25/0737* (2013.01); *F02B 29/083* (2013.01); *F02D 9/16* (2013.01);
(Continued)

(58) Field of Classification Search
CPC .............................. F02M 25/07; F02M 35/108
USPC ............ 123/184.25, 184.26, 184.27, 184.35, 123/184.36, 184.43, 184.44, 184.48, 123/184.49, 184.51, 184.53, 184.59, 123/568.11, 568.15, 568.17, 568.19
See application file for complete search history.

(56) References Cited

U.S. PATENT DOCUMENTS 3,370,575 A * 2/1968 Soubis .......................... 123/216
4,191,140 A * 3/1980 Matsumoto et al. ..... 123/184.42
(Continued)

FOREIGN PATENT DOCUMENTS

DE         4014291 A1    11/1991
DE        19523107 A1     1/1997
(Continued)

OTHER PUBLICATIONS

English abstract for DE-4014291.
(Continued)

*Primary Examiner* — Mahmoud Gimie
*Assistant Examiner* — David Hamaoui
(74) *Attorney, Agent, or Firm* — Rader, Fishman & Grauer PLLC (57) ABSTRACT

A dual path fresh air system, having a first air supply path, the first path supplies air to at least one first cylinder set; a second air supply path, the second path supplies air to at least on second cylinder set; a first exhaust gas recirculation inlet fluidly connected to the first path to introduce recirculated exhaust gas into the first path; a second exhaust gas recirculation inlet fluidly connected to the second path to introduce recirculated exhaust gas into the second path; a first valve member, which is arranged upstream of the first exhaust gas recirculation inlet in the first path, wherein the first valve member controls fluid flowing through a cross section of the first path; and a second valve member which is arranged upstream of the second exhaust gas recirculation inlet in the second path, for controlling fluid flowing through a cross section of the second path.

20 Claims, 11 Drawing Sheets

(51) Int. Cl.
  *F02B 29/08* (2006.01)
  *F02D 9/16* (2006.01)
  *F02M 35/116* (2006.01)
  *F02D 9/02* (2006.01)

(52) U.S. Cl.
  CPC ...... *F02M 25/0735* (2013.01); *F02M 25/0746* (2013.01); *F02M 25/0751* (2013.01); *F02M 25/0793* (2013.01); *F02M 25/0796* (2013.01); *F02M 35/10222* (2013.01); *F02M 35/10255* (2013.01); *F02M 35/116* (2013.01); *F02D 2009/0279* (2013.01); *F02M 25/0707* (2013.01); *F02M 25/0773* (2013.01); *Y02T 10/121* (2013.01); *Y02T 10/146* (2013.01)
  USPC ............ 123/568.11; 123/184.26; 123/184.27; 123/184.36; 123/184.44; 123/184.49; 123/184.51; 123/184.53; 123/184.59

(56) References Cited

U.S. PATENT DOCUMENTS

| | | | | |
|---|---|---|---|---|
| 4,344,393 | A * | 8/1982 | Etoh et al. | 123/672 |
| 4,348,994 | A * | 9/1982 | Tanaka et al. | 123/198 F |
| 4,391,240 | A * | 7/1983 | Sugasawa et al. | 123/672 |
| 4,483,288 | A * | 11/1984 | Ueno et al. | 123/198 F |
| 4,485,776 | A * | 12/1984 | Mokuya et al. | 123/198 F |
| 4,494,493 | A * | 1/1985 | Morikawa et al. | 123/184.52 |
| 4,502,435 | A * | 3/1985 | Tadokoro et al. | 123/198 F |
| 4,630,575 | A * | 12/1986 | Hatamura et al. | 123/184.48 |
| 4,705,009 | A * | 11/1987 | Asayama | 123/704 |
| 4,708,097 | A * | 11/1987 | Hatamura et al. | 123/184.36 |
| 4,756,284 | A * | 7/1988 | Okimoto et al. | 123/216 |
| 5,005,533 | A * | 4/1991 | Suzuki et al. | 123/184.22 |
| 5,027,769 | A * | 7/1991 | Yoshida et al. | 123/399 |
| 5,562,086 | A * | 10/1996 | Asada et al. | 123/568.21 |
| 7,107,761 | B2 * | 9/2006 | Fukuma et al. | 60/285 |
| 7,353,102 | B2 * | 4/2008 | Narita et al. | 701/102 |
| 7,448,205 | B2 * | 11/2008 | Takahashi et al. | 60/285 |
| 7,461,627 | B2 * | 12/2008 | Liu et al. | 123/295 |
| 7,540,269 | B2 * | 6/2009 | Bloomer et al. | 123/184.44 |
| 7,789,064 | B2 * | 9/2010 | Elsasser et al. | 123/306 |
| 7,953,540 | B2 * | 5/2011 | Ito et al. | 701/103 |
| 8,176,902 | B2 * | 5/2012 | Elsasser et al. | 123/568.19 |
| 8,612,118 | B2 * | 12/2013 | Elsasser | 701/103 |
| 2005/0061304 | A1 * | 3/2005 | Moser et al. | 123/568.2 |
| 2007/0169763 | A1 * | 7/2007 | Kawai et al. | 123/568.2 |
| 2011/0036412 | A1 * | 2/2011 | Elsasser et al. | 137/2 |
| 2012/0124997 | A1 * | 5/2012 | Elsasser et al. | 60/615 |

FOREIGN PATENT DOCUMENTS

| | | |
|---|---|---|
| DE | 19858771 A1 | 7/1999 |
| DE | 10001638 A1 | 3/2001 |
| DE | 10340062 A1 | 3/2005 |
| DE | 102004044249 A1 | 3/2006 |
| EP | 0223378 A2 | 5/1987 |
| EP | 1270918 A1 | 1/2003 |
| GB | 2173857 A | 10/1986 |
| WO | WO-89/03473 A1 | 4/1989 |
| WO | WO 2005108756 A1 * | 11/2005 |
| WO | WO-2007/035972 A2 | 4/2007 |
| WO | WO-2008/017605 A1 | 2/2008 |

OTHER PUBLICATIONS

English abstrat for DE-10001638.
English abstract for DE-19523107.
English abstract for DE-19858771.
English abstract for DE-102004044249.

* cited by examiner

FRESH AIR SYSTEM

CROSS-REFERENCES TO RELATED APPLICATIONS

This application claims priority to German patent applications DE 10 2008 033 885.0, filed on Jul. 18, 2008, and DE 10 2008 046 596.8, filed on Sep. 10, 2008, and PCT/EP2009/058927, filed on Jul. 13, 2009, all of which are hereby incorporated by reference in their entirety.

TECHNICAL FIELD

The present invention relates to a fresh air system for an internal combustion engine, in particular of a motor vehicle.

BACKGROUND

A fresh air system is used to supply an internal combustion engine or its cylinders with fresh air. In order to reduce fuel consumption and emissions of pollutants, it is customary to feed combustion gases back to the fresh air system, which are introduced into the fresh air system via a corresponding exhaust gas recirculation inlet. It is difficult to feed the desired amount of exhaust gas back into the fresh air system during certain operating states of the internal combustion engine owing to the prevailing pressure conditions. To avoid for example an expensive pump in an exhaust gas recirculation line, it is possible in principle to arranged a valve member upstream of the exhaust gas recirculation inlet in the fresh air system, with the aid of which valve member a cross section through which fluid can flow of the fresh air system can be controlled. By briefly reducing the cross section through which fluid can flow, a load alternation process of the pressure can be reduced in the region of the exhaust gas recirculation inlet during the filling phase, which facilitates the introduction of the recirculated exhaust gas. A desired exhaust gas recirculation rate can be set in particular by targeted actuation of the valve member.

SUMMARY

The present invention is concerned with the problem of specifying an improved embodiment for a fresh air system of the type mentioned at the start, which embodiment is characterised in particular in that it allows comparatively reliable and easily controlled exhaust gas recirculation up to the highest EGR rates with comparatively simple means.

This problem is solved according to the invention by the subject matter of the independent claim. Advantageous embodiments form the subject matter of the dependent claims.

The invention is based on the general idea of giving the fresh air system a dual path configuration and allocating a dedicated exhaust gas recirculation inlet and valve member to each path. The first path is allocated to the first cylinders of the internal combustion engine and supplies them with air, whereas the second path is allocated to the second cylinders of the internal combustion engine for air supply. The invention uses the finding that overlaps during the charge phases of the individual cylinders can occur in internal combustion engines with a relatively large number of cylinders. An individual valve member for controlling the pressure at an individual exhaust gas recirculation inlet must then switch at a comparatively high frequency in order to be able to set the desired exhaust gas recirculation rate for the individual charge phases. Furthermore, undesired interactions can occur owing to the overlapping charge phases, which makes it more difficult to set an exact exhaust gas recirculation rate for the individual cylinders. Thanks to the use of a dual path fresh air system, it is now possible to group the cylinders of the internal combustion engine in such a manner that the load alternation processes in the individual cylinders are separated better from each other within the respective cylinder group, so that in particular the charge phases of the individual cylinders can follow each other without overlaps in the respective cylinder group. For example, in a straight-six engine, the first three cylinders can be allocated to a first cylinder group and the second three cylinders can be allocated to s second cylinder group. In a V6, engine, the three cylinders of the first bank of cylinders can form the first cylinder group, whereas the three cylinders of the second bank of cylinders can form the second cylinder group. The individual valve members can control the exhaust gas recirculation to the cylinders better due to the division into cylinder groups which are supplied with fresh air via separate paths of the fresh air system, as the successive filling phases are separated comparatively clearly from each other within the respective cylinder group. Consequently, there is more time available to realise a desired pressure at the respective exhaust gas recirculation inlet, as a result of which a desired exhaust gas recirculation rate can be set more accurately. Furthermore, the valve members can operate much more slowly, which improves their synchronisation and increases the reliability and quality of the exhaust gas recirculation rates set. The additional outlay for realising the two separated paths with separate exhaust gas recirculation inlets and separate valve members is comparatively small. This additional outlay can in particular be essentially compensated by the simpler construction of the valve members or a corresponding actuation device.

An embodiment in which a valve device is provided which comprises the two valve members and a common drive member for the two valve members is particularly advantageous. The two valve members can be coupled to the drive member in a phase-offset manner, in particular in such a manner that one valve member minimises or blocks the cross section through which fluid can flow of one path whereas at the same time the other valve member maximises or opens the cross section through which fluid can flow of the other path, and vice versa. This design allows the actuation of the two valve members to be realised comparatively inexpensively, as only one common drive member is necessary.

In another advantageous embodiment, a functional module can be provided which forms a dual path section of a fresh air tract which conducts fresh air to the internal combustion engine, which tract contains the two valve members and the two exhaust gas recirculation inlets and is installed as a separate unit in the fresh air tract. Such a functional module thus forms an assembly which can be preassembled independently of the other components of the fresh air system and can then be installed as a unit in the fresh air tract. This simplifies assembly and ultimately reduces the production costs of the fresh air system.

According to another advantageous embodiment, at least one connection opening which can be controlled with a control member can be formed in a partition which separates the two paths from each other. When the control member is in the open position, this connection opening connects the two paths to each other in a communicating manner, whereas the two paths are separated from each other when the control member is in the closed position. When the connection opening is opened, that is, when the control member is set to the open position, the fluidic separation of the two paths is suspended in order to couple them to each other fluidically. An emergency mode for the internal combustion engine can be realised with the aid of this design if one path is blocked in the event of a defect of one of the valve members or the valve device. In this emergency mode, although the exhaust gas recirculation no longer functions in the desired manner, the internal combustion engine can still be operated in principle. The vehicle can in particular be driven under its own power to the nearest workshop. An internal bypass can thus be realised inside the dual path fresh air system with the aid of the controllable connection opening in order to allow an emergency mode for the internal combustion engine. This internal bypass can be realised comparatively inexpensively, in particular without a great additional installation space requirement. In contrast, in a single path fresh air system, an external bypass would have to be provided, which requires considerably more installation space and is associated with increased costs.

In a further advantageous embodiment, a control member can be provided in addition to the valve members, which control member opens a path when in an open position and closes it when in a closed position. In connection with the valve member allocated to the other path, it is possible with the aid of the control member to block both paths at the same time, even if the two valve members are arranged in a phase-offset manner with respect to each other and have a common drive. By blocking the two paths at the same time the fresh air supply of the internal combustion engine can be interrupted, as a result of which the latter shuts down, in order to realise an emergency shutdown of the internal combustion engine.

Further important features and advantages of the invention can be found in the subclaims, the drawings and the associated description of the figures using the drawings.

It is self-evident that the features which are mentioned above and those which are still to be explained below can be used not only in the combination specified in each case, but also in other combinations or alone without departing from the scope of the present invention.

BRIEF DESCRIPTION OF THE DRAWING

Preferred exemplary embodiments of the invention are shown in the drawings and are explained in more detail in the following description, with the same reference symbols referring to the same or similar or functionally identical components.

In the figures.

DETAILED DESCRIPTION

Figure 1:
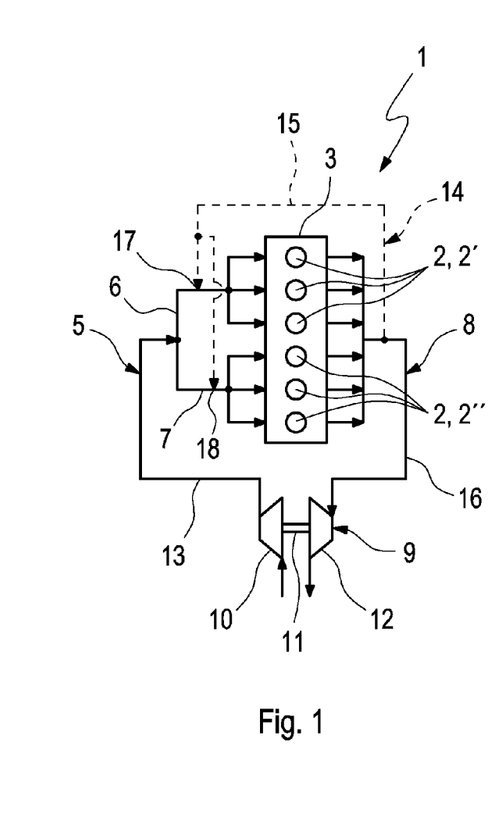
FIGS. 1, 2a and 2b in each case show a highly simplified, circuit diagram-like principle illustration of an internal combustion engine with a fresh air system in different embodiments, FIGS. 3 to 6 in each case show a high simplified, principle longitudinal section through the fresh air system in the region of an exhaust gas recirculation, FIGS. 7 to 10 in each case show illustrations as in FIGS. 3 to 6, but in a different embodiment, FIGS. 11 to 12 in each case show illustrations as in FIGS. 3 and 4, but in a different embodiment.

According to FIGS. 1, 2a and 2b, an internal combustion engine 1, which is arranged in particular in a motor vehicle, comprises a plurality of cylinders 2, which can be arranged according to FIG. 1 in a single engine block 3 or according to FIGS. 2a and 2b in two separate cylinder banks 4. A six-cylinder engine is shown in both cases. FIG. 1 shows a straight engine whereas FIGS. 2a and 2b show a V engine. It is clear that in principle other numbers of cylinders and/or engine variants can also be configured according to the invention.

The internal combustion engine 1 has a fresh air system 5 for supplying the cylinders 2 with fresh air. The fresh air system 5 has a dual path configuration, at least in a section leading to the cylinders 2, and correspondingly has a first path 6 for the air supply of first cylinders 2' and a second path 7 for the air supply of second cylinders 2". In the examples shown, in each case one first cylinder group with three first cylinders 2' and a second cylinder group with three second cylinders 2" is accordingly realised. The cylinders 2 are expediently grouped in such a manner that the load alternation processes of the individual cylinders 2 within the respective cylinder group overlap as little as possible or not at all with respect to their charge phases. In the straight engine of FIG. 1, the two cylinder groups are arranged one after the other. In the V engine of FIGS. 2a and 2b, each cylinder group is allocated to one of the cylinder banks 4.

The internal combustion engine 1 also has an exhaust gas system 8 which conducts combustion gases away from the cylinders 2. In the example the internal combustion engine 1 is charged. To this end, a charging device 9 is provided, with the aid of which the pressure level in the fresh air system 5 can be increased. The charging device 9 can be for example an exhaust gas turbocharger which has a compressor 10 arranged in the fresh air system 5 and a turbine 12 which is drive-coupled to the compressor 10 via a shaft 11 and arranged in the exhaust gas system 8. The compressor 10 is expediently arranged in a single path section of a fresh air tract 13 of the fresh air system 5.

Furthermore, the internal combustion engine 1 is equipped with an exhaust gas recirculation device 14, which is referred to below as EGR device 14. Exhaust gas can be fed to the fresh air system 5 with the aid of the EGR device 14. To this end, an exhaust gas recirculation line 15, which is referred to below as EGR line 15, can receive exhaust gas at a suitable point, for example at an exhaust gas tract 16 of the exhaust gas system 8, and conduct it to exhaust gas recirculation inlets 17, 18 of the fresh air system 5, which are referred to below as EGR inlets 17, 18. The EGR devices 14 can also have a dual path configuration to a greater or lesser extent. For example, the embodiment of FIG. 2b has two separate EGR lines 15' and 15". Moreover, in the variant according to FIG. 2b, the exhaust gas system 8 also has a dual path configuration at least as far as the charging device 9.

According to FIGS. 3 to 12, the fresh air system 5 has the two EGR inlets 17, 18 in a dual path section. Accordingly, the first EGR inlet 17 is attached or connected in a communicating manner to the first path 6. Furthermore, the second EGR inlet 18 is attached or connected in a communicating manner to the second path 7. In the example, two integrally formed connection pieces 19 are provided which have or form the respective EGR inlet 17, 18 and to which the corresponding EGR line 15 can be attached.

The dual path fresh air system 5 has a first valve member 20 upstream of the EGR inlet 17 in the first path 6, with the aid of which valve member a cross section 21 through which fluid can flow of the first path 6 can be controlled. Analogously to this, a second valve member 22 for controlling a cross section 23 through which fluid can flow of the second path 7 is allocated to the second path 7. The second valve member 22 is situated inside the second path 7 upstream of the second EGR inlet 18. The main flow direction of the fresh air in the fresh air system 5 is indicated by arrows and labelled 24 in the figures. The valve members 20, 22 can control, that is, vary the respectively allocated cross section 21, 23 through which fluid can flow within the respective path 6, 7. The valve members 20, 22 can in particular minimise, preferably essentially completely block, and maximise, preferably essentially completely open, the respective cross section 21, 23. FIGS. 3, 4 and 6 to 12 show the first valve member 20 in its closed position, whereas the second valve member 22 is shown in its open position. The valve members 20, 22 can be seen here as flaps, in particular as butterfly flaps, which can be adjusted in a rotary manner about a rotation axis 25 which extends transversely to the main flow direction 24. The two valve members 20, 22 can be part of a valve device 26 which also has a common drive member 27 for the two valve members 20, 22. The drive member 27 drives for example a drive shaft 28 in a rotary manner about the rotation axis 25, which drive shaft is connected in a rotationally fixed manner to the valve members 20, 22.

The two valve members 20, 22 are expediently arranged on the drive shaft 28 in a phase-offset manner with respect to each other, as a result of which they are coupled in a correspondingly phase-offset manner to the drive member 27. The phase offset is expediently selected in such a manner that the first valve member 20 minimises or blocks the cross section 21 through which fluid can flow of the first path 6, whereas at the same time the second valve member 22 maximises or opens the cross section 23 through which fluid can flow of the second path 7. In the example, the two valve members 20, 22 are therefore arranged on the drive shaft 28 offset to each other by 90°. The relative angular position of the two valve members 20, 22 is invariant in the examples shown. In principle, a valve device 26 is also conceivable in which the relative angular position between the two valve members 20, 22, that is, their phase position, can be set during operation of the internal combustion engine 1.

In the preferred example shown, the valve device 26 is configured as a continuously operating valve device 26, in which the valve members 20, 22 permanently rotate such that they are synchronised with the speed of the internal combustion engine 1, so that the cross section 21, 23 through which fluid can flow of the two paths 6, 7 permanently change. Comparatively great closing phases can be realised by depressions in the lateral boundary walls, depending on the engine design and the necessary pressure reductions. The radial extent of the flap-shaped valve members 20, 22 is then greater than the corresponding distance between the mutually opposite channel walls, so that the flaps dip into the said depressions with their outer edges and minimise or block the cross section 21, 23 through which fluid can flow for the time in which the flaps move in the depressions. The opening and closing times of the valve members 20, 22 can be changed, in particular dynamically, by changing the rotation speed.

Alternatively, the valve device 26 can also be configured as a discontinuously operating valve device, in which the valve members 20, 22 are switched between two end positions (closed position and open position), wherein the valve members 20, 22 briefly rest in the respective end position to realise the desired closing or opening times.

The drive member 27 can be formed by any suitable drive. For example, it is an electric motor. It is likewise possible to realise the drive member 27 by means of a drive coupling which couples the valve device 26 with a shaft of the internal combustion engine 1 which is driven in a rotary manner. For example, the drive member 27 can be a drive coupling with a camshaft or crankshaft of the internal combustion engine 1.

The valve members 20, 22 are used to set a desired exhaust gas recirculation rate, which is referred to below as EGR rate. The EGR rate depends on the current operating state of the internal combustion engine 1. In a simple case the valve members 20, 22 switch proportionally to the speed of the internal combustion engine 1, which can be realised in particular by a forced coupling in drive terms. In principle, a control device 29 can however also be provided, with the aid of which the drive member 27 or the valve device 26 can be actuated depending on predefined parameters.

The fresh air system 5 preferably has a functional module 30. This forms a dual path section of the fresh air tract 13 and contains the two valve members 20, 22 and the two EGR inlets 17, 18. The functional module 30 is configured as a separate unit and added to the customary fresh air tract 13 or integrated in it. In the example, the fresh air tract 13 has a single path configuration as far as the functional module 30 in the main flow direction 24, whereas it has a dual path configuration from the functional module 30.

Figure 3:
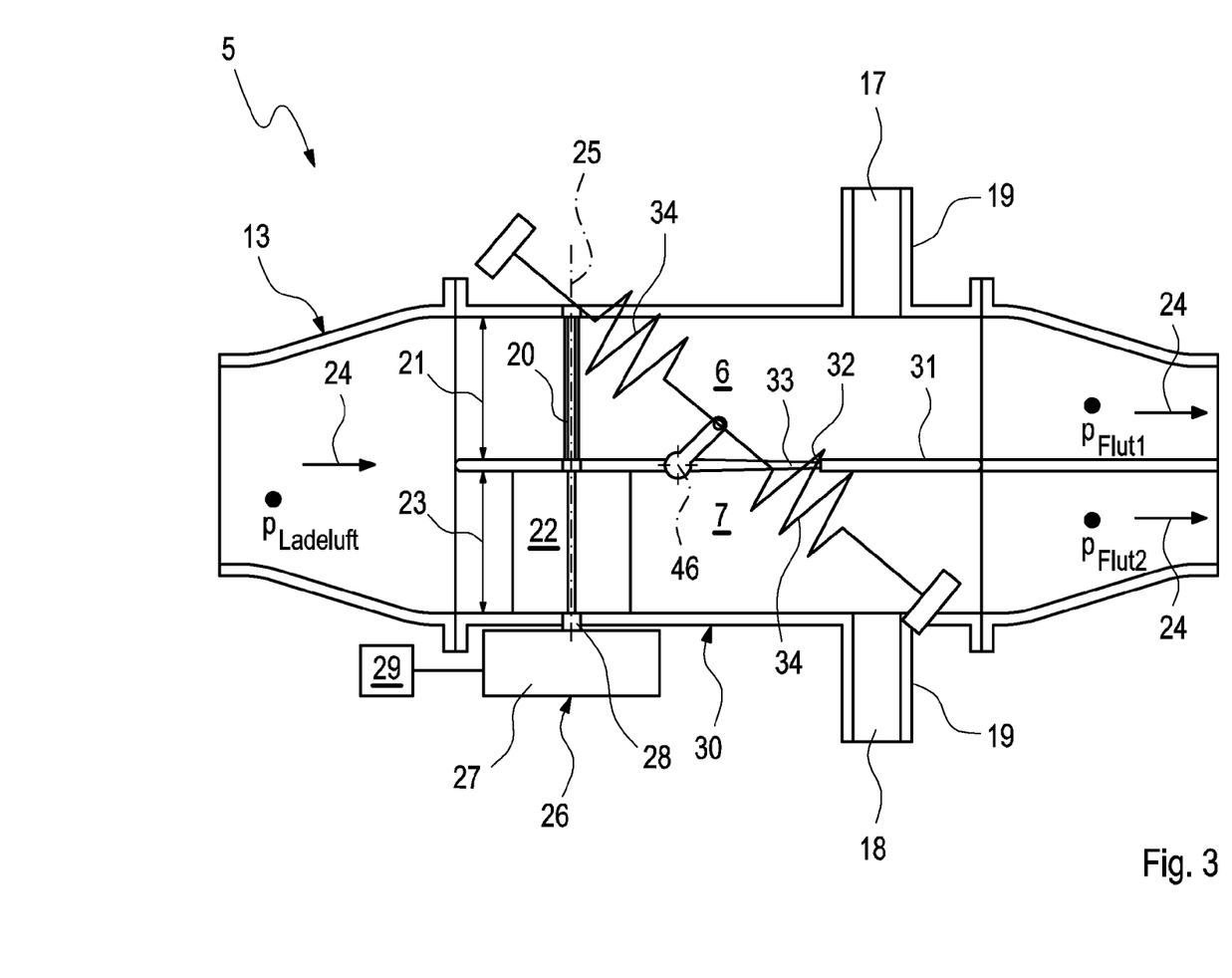
Figure 6:
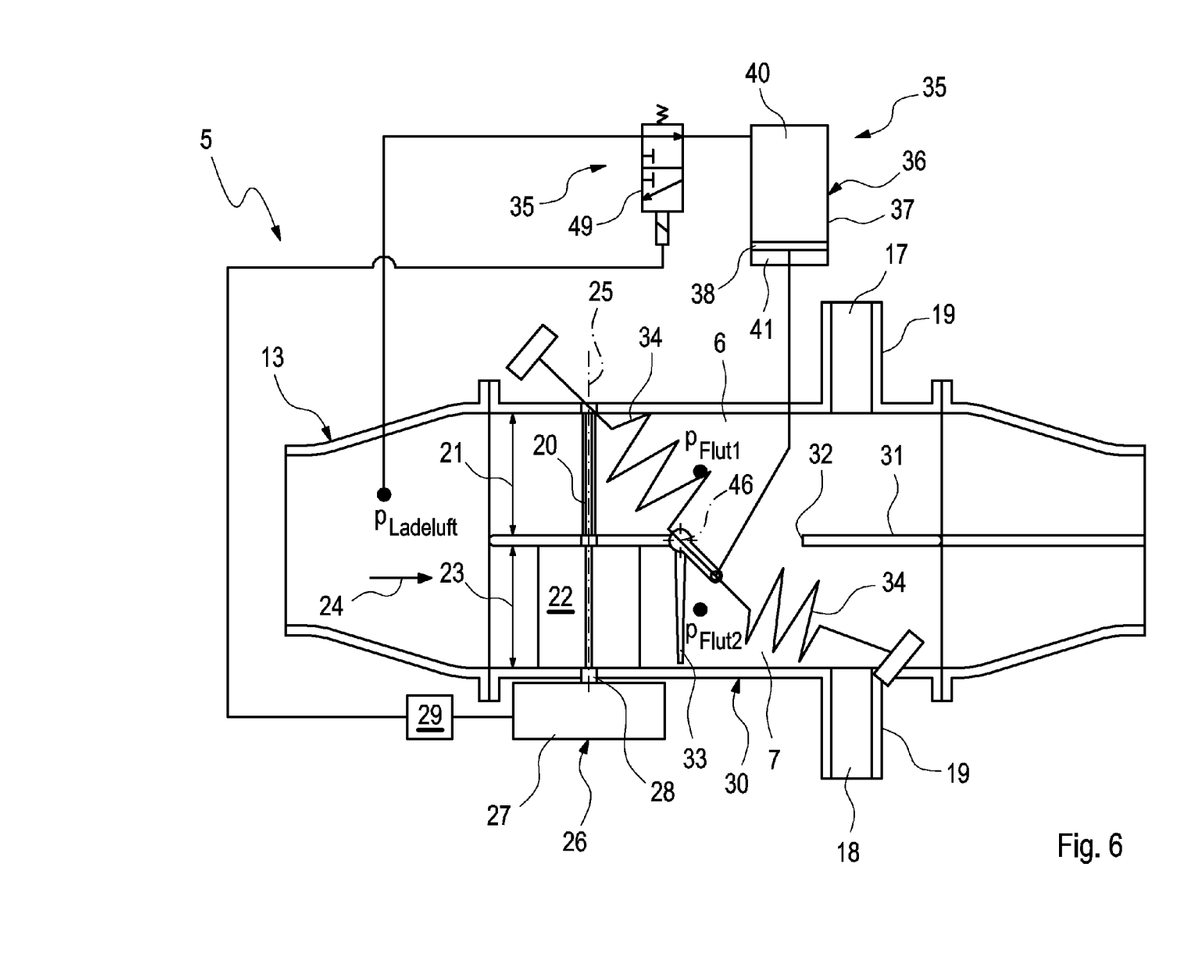
Figure 7:
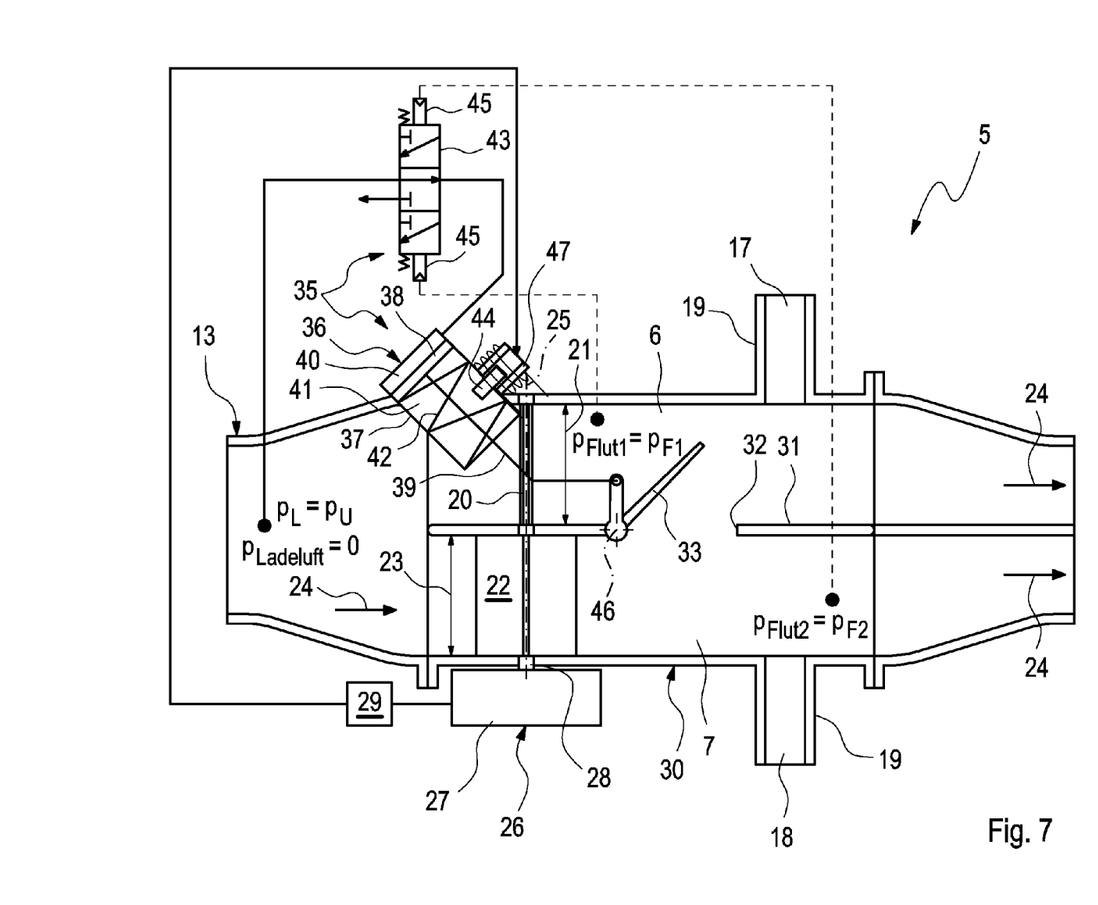
Figure 8:
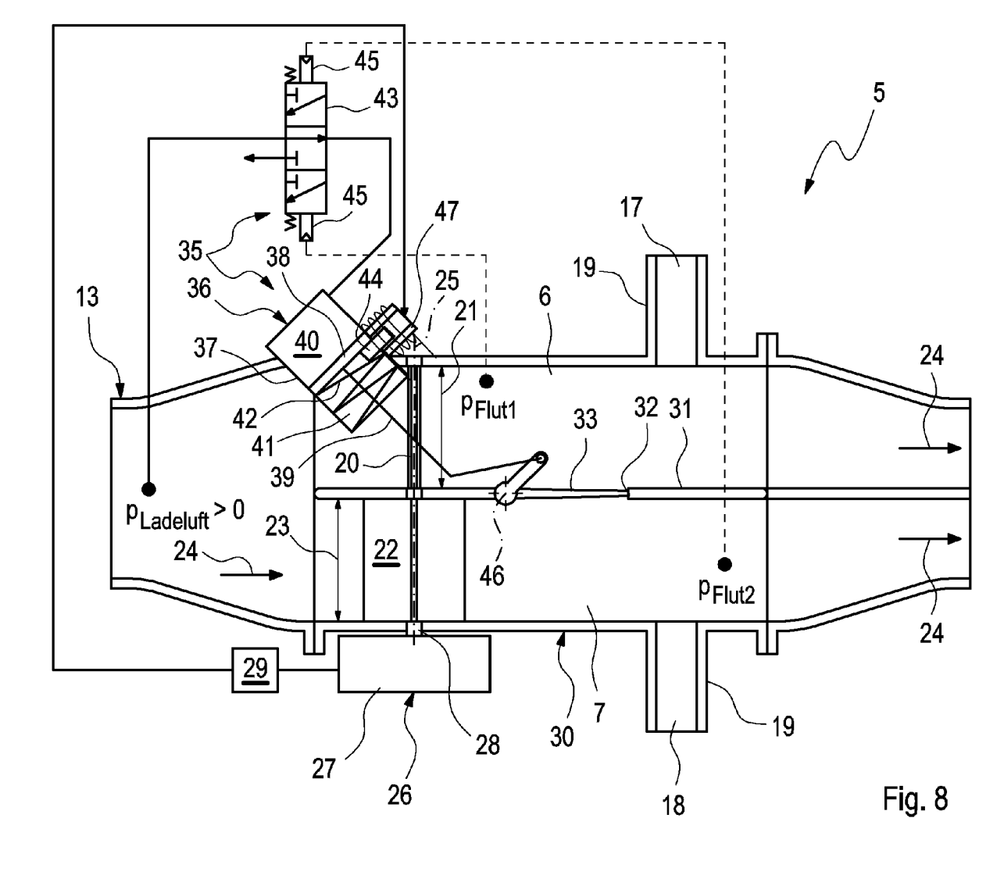
Figure 9:
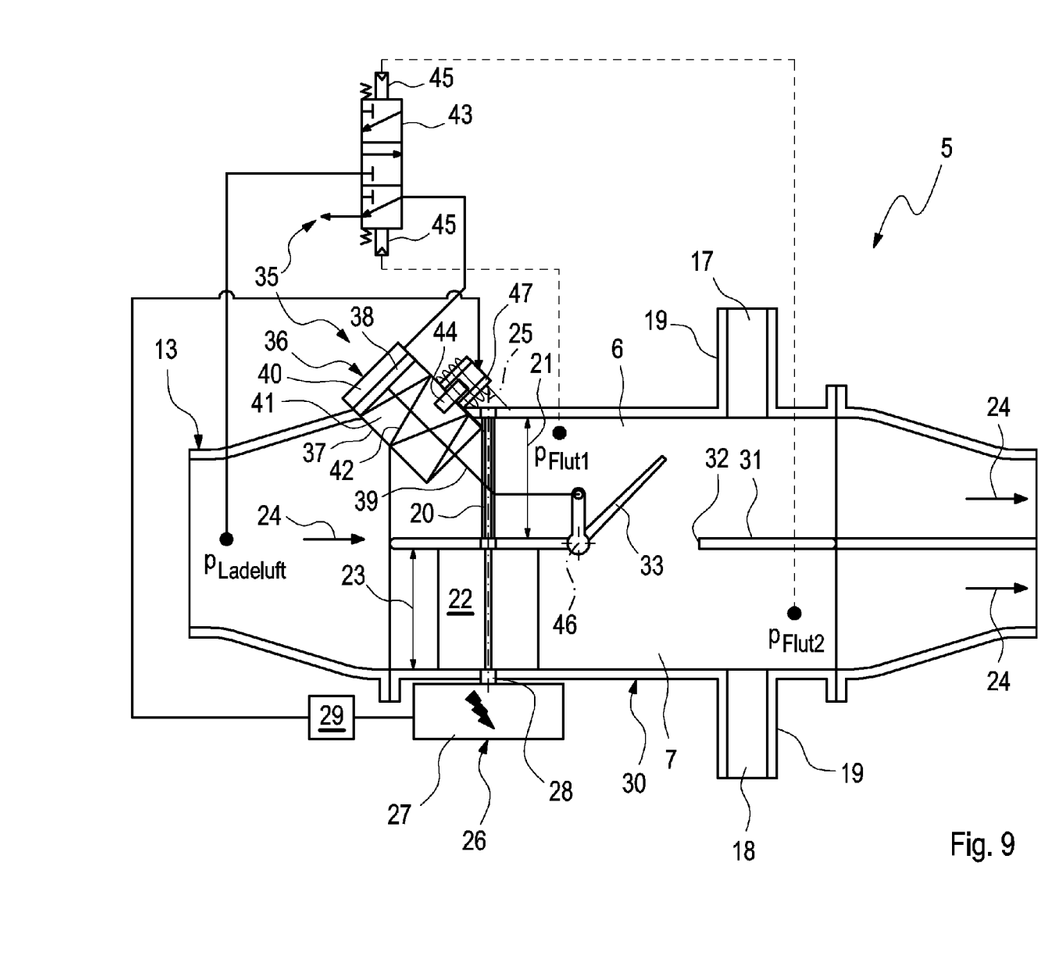
Figure 10:
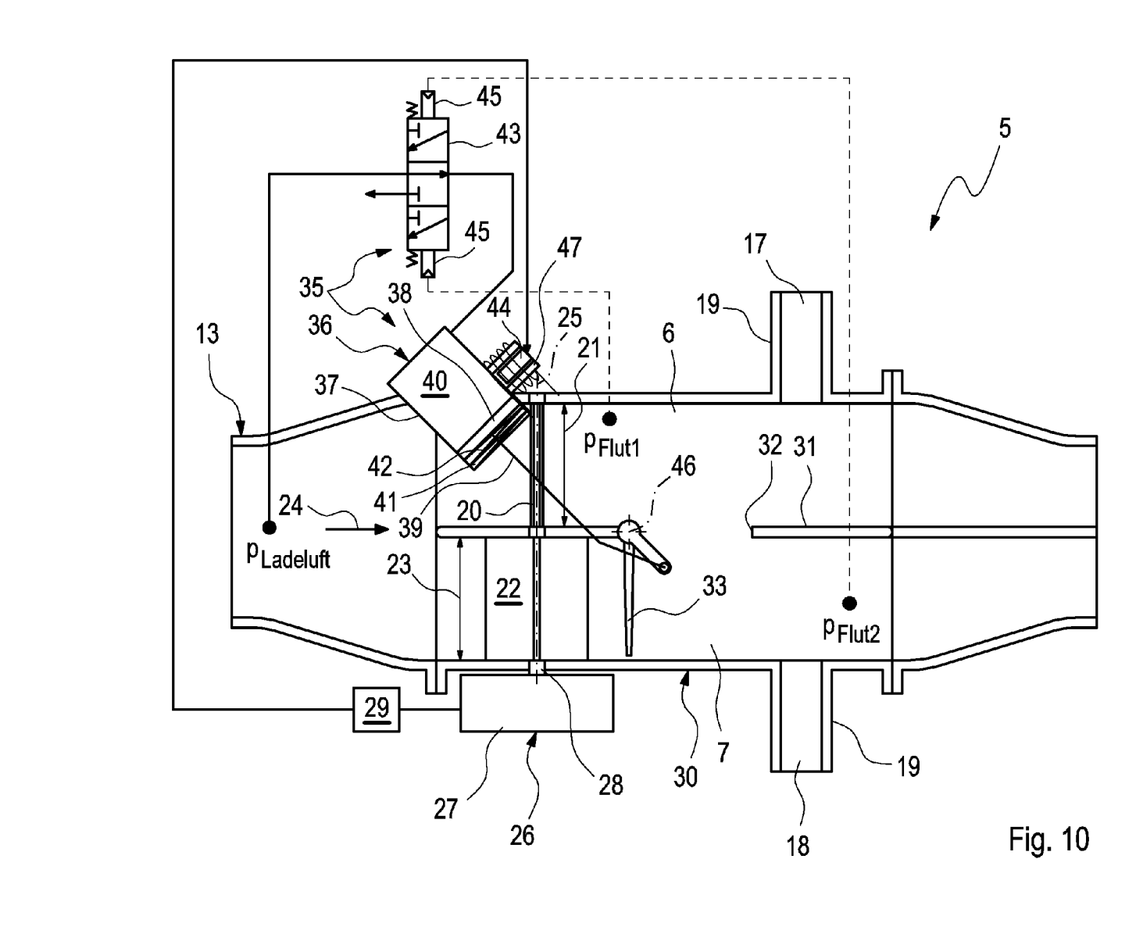
Figure 11:
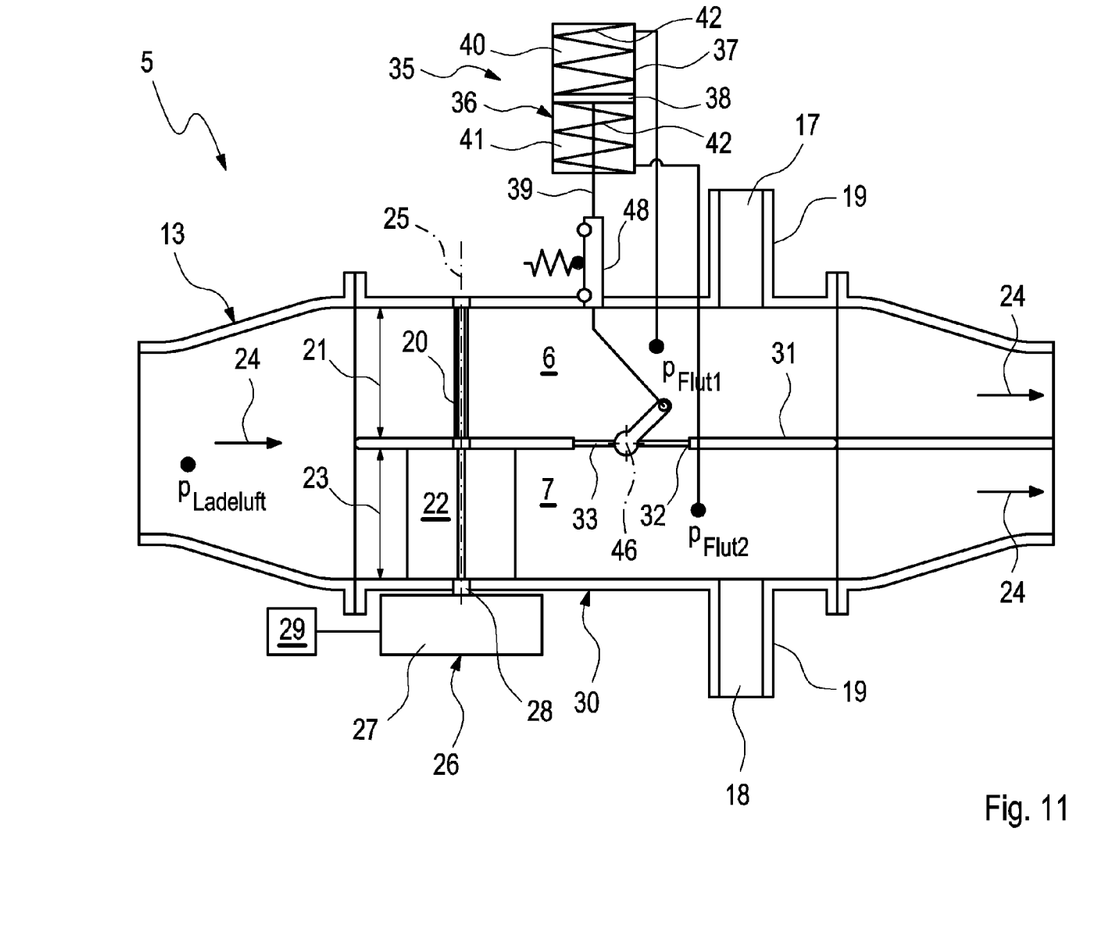

In the embodiments of FIG. 3-12 shown here, the two paths 6, 7 are separated from each other by a partition 31, in particular inside the functional module 30. At least one connection opening 32 which is allocated to a control member 33 is formed in this partition 31. The connection opening 32 can be opened and closed with the aid of this control member 33. In an open position of the control member 33 which is shown in FIGS. 4, 5, 7, 9 and 12, the connection opening 32 is open, so that the two paths 6, 7 are connected in a communicating manner to each other by the connection opening 32. When the control member 33 is in the closed position which is shown in FIGS. 3, 8 and 11, the control member 33 closes the connection opening 32, as a result of which the two paths 6, 7 are separated from each other. The connection opening 32 is arranged downstream of the two valve members 20, 22. The connection opening 32 is expediently also arranged upstream of the two EGR inlets 17, 18. An emergency mode can be realised for the internal combustion engine 1 with the aid of the connection opening 32 and the control member 33 in case the valve device 26 is defective and becomes stuck in a state in which one of the two paths 6, 7 is blocked or at least greatly throttled.

The control member 33 can, correspondingly to the embodiment shown in FIG. 3-6, be actuated passively, by a pressure difference occurring between the paths 6, 7 downstream of the two valve members 20, 22. The control member 33 opens the connection opening 32 when the pressure difference between the paths 6, 7 reaches a predefined limit value.

During normal operation of the internal combustion engine 1 and the valve device 26, the pressure in the two paths 6, 7 rise and fall permanently and alternately. The pressure differences produced between the two paths 6, 7 are comparatively small. So that the control member 33 does not permanently open and close with these pressure differences which are below the predefined limit value, the said control member can be held in the closed position by means of a suitable retaining device, for example by means of a magnetic and/or mechanical lock. For example, a mechanical lock can be realised by means of a spring-loaded sphere which engages in a recess. Furthermore, the control member 33 can be prestressed into the closed position by spring force. Corresponding restoring springs 34 are indicated in FIG. 3-6. The restoring springs 34 can alternatively or additionally be provided for a retaining device in order to hold the control member 33 in its closed position.

Figure 4:
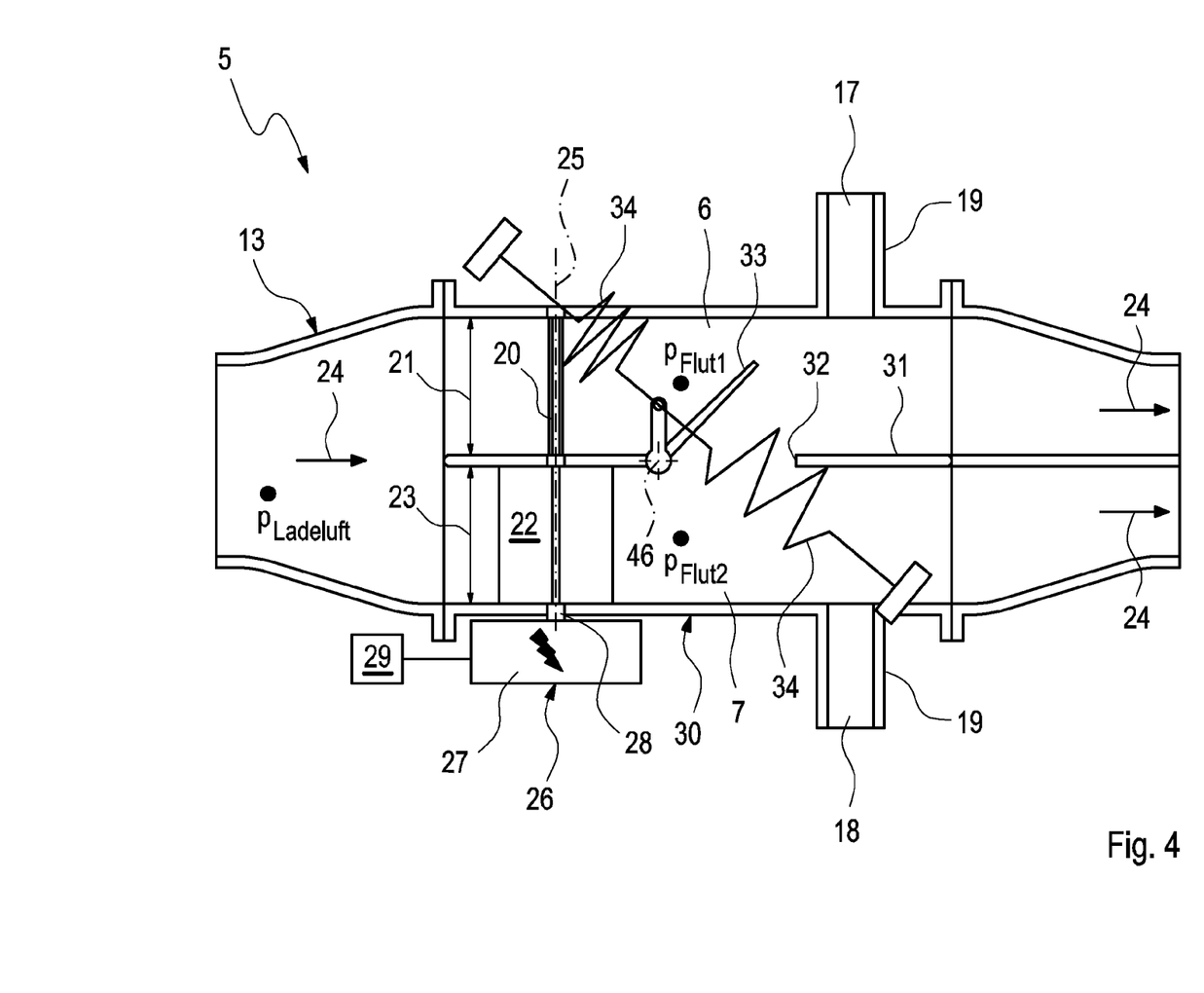
Figure 5:
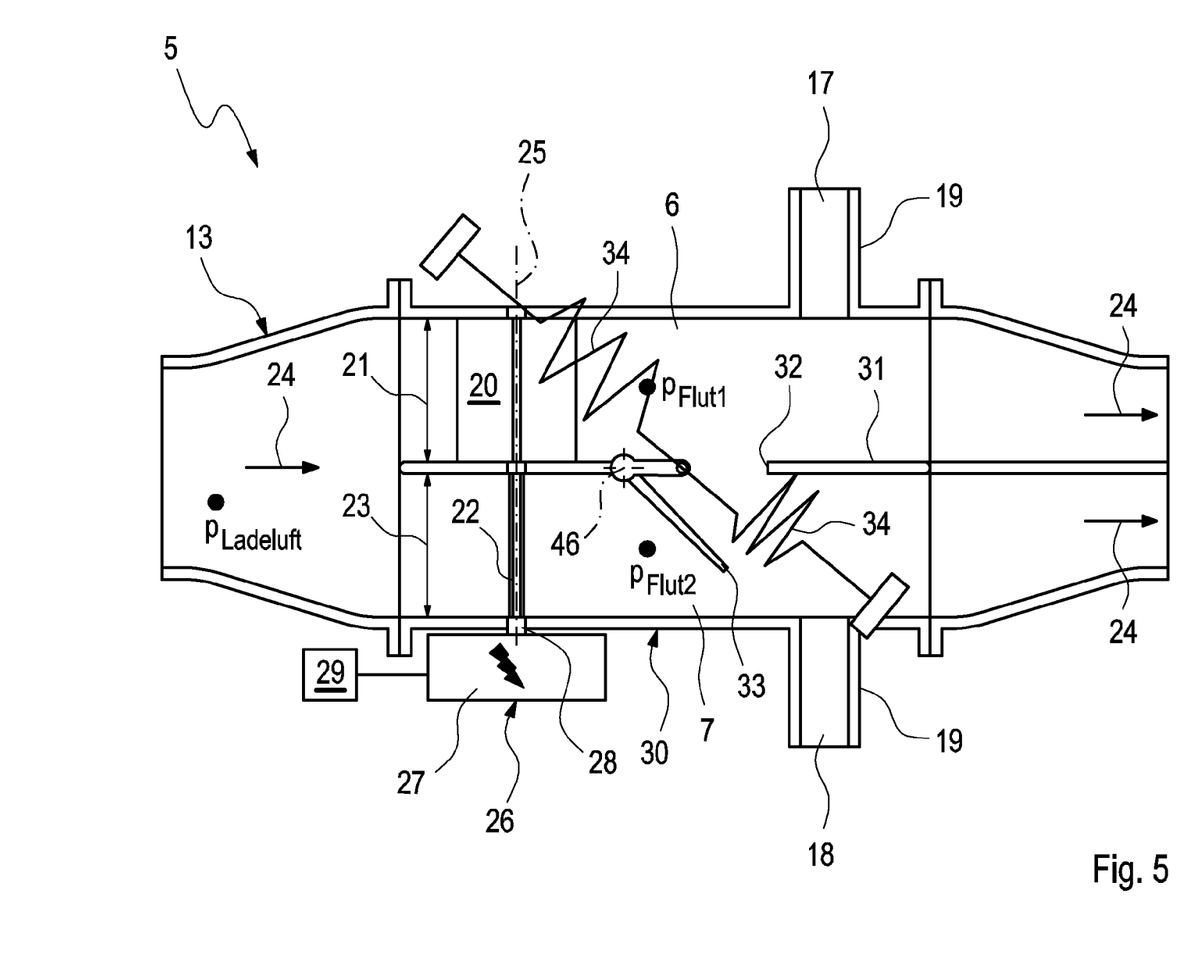

As soon as the valve device 26 sticks in one position according to FIGS. 4 and 5, in which according to FIG. 4 the first valve member 20 blocks the first path 6 or according to FIG. 5 the second valve member 22 blocks the second path 7, a vacuum is produced downstream of the respective valve member 20, 22 owing to load alternation processes in the respective blocked path 6, 7, which vacuum ultimately results in the pressure difference between the two paths 6, 7 reaching the predefined limit value. Consequently, the control member 33 opens the connection opening 32, through which fresh air can pass from the respectively unblocked path 6, 7 into the blocked path 6, 7, and the fresh air supply of the cylinders 2 allocated to the blocked path 6, 7 can be ensured. With the opening of the control member 33 or of the connection 32, a pressure equalisation occurs between the two paths 6, 7; so that the control member 33 does not close again owing to the spring loading, a retaining device, in particular a lock can also be provided for the open positions of the control member 33.

Figure 12:
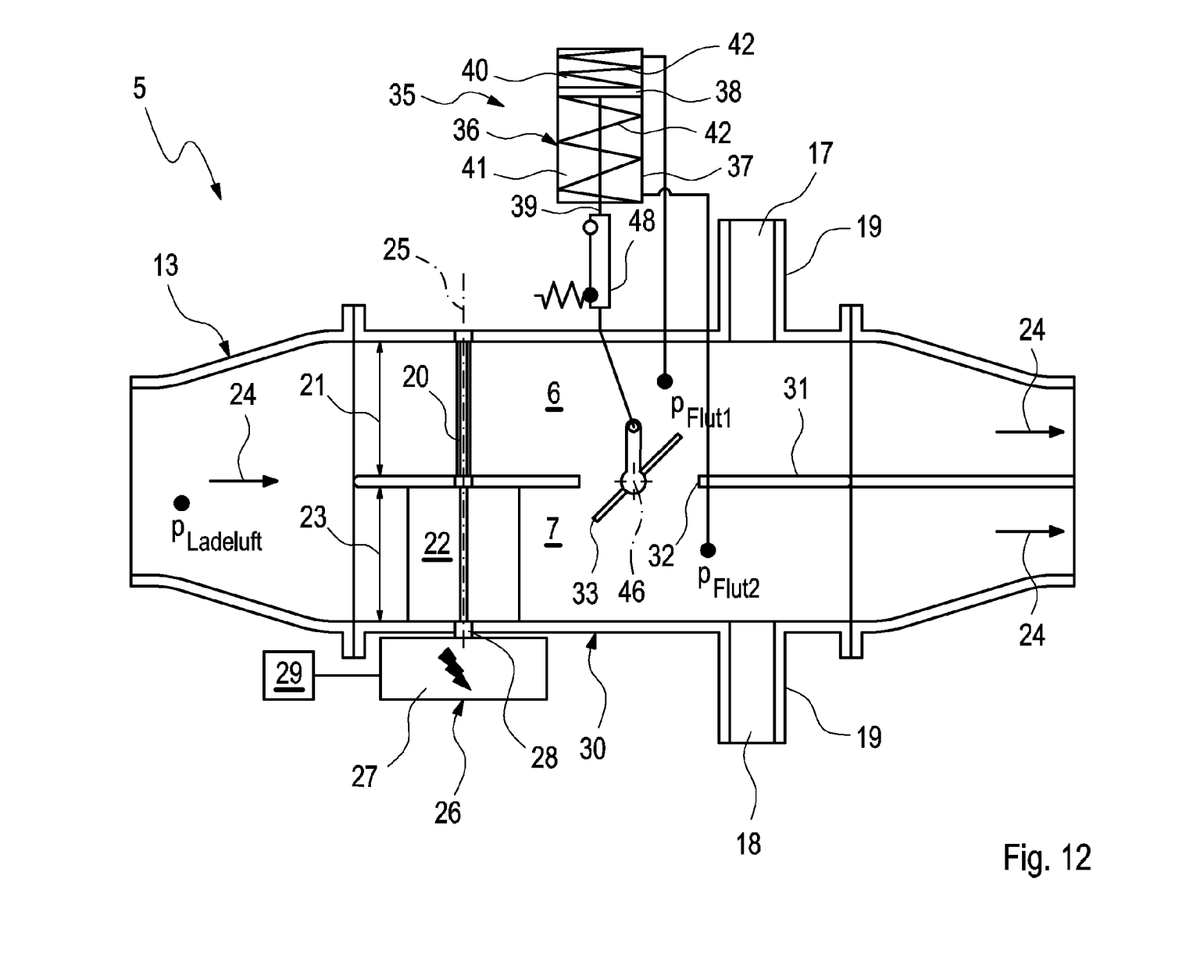

According to FIG. 7-12, an actuation device 35 can be provided to actuate the control member 33. This is expediently configured in such a manner that it actuates the control member 33 depending on the pressures in the paths 6, 7 downstream of the two valve members 20, 22. This actuation device 35 can have a pneumatic piston cylinder unit 36 which has a piston 38 which can be moved in a cylinder 37 and is drive-connected to the control member 33 for example by means of a piston rod 39. The piston 38 separates a pressure space 40 from a counterpressure space 41 in the cylinder 37. In the embodiment shown in FIG. 7-10, a restoring spring 42 is arranged in the counterpressure space 41. Furthermore, the counterpressure space 41 in this embodiment is coupled to the atmospheric environment. Accordingly, the piston cylinder unit 36 of the embodiment shown in FIG. 7-10 is controlled by the pressure in the pressure space 40. In contrast to this, FIGS. 11 and 12 show an embodiment in which a restoring spring 42 is also arranged in the pressure space 40. The pressure space 40 is pneumatically coupled to the first path 6 whereas the counterpressure space 41 is pneumatically coupled to the second path 7. Accordingly, this piston cylinder unit 36 is controlled by the pressure difference between the pressure space 40 and the counterpressure space 41.

In the embodiment shown in FIG. 7-10, the actuation device is also equipped with a control valve 43. This is connected in such a manner that it actuates the piston cylinder unit 36 depending on the pressure difference between the two paths 6, 7 downstream of the two valve members 20, 22. The pressure space 40 is loaded by the control valve 43 with the pressure prevailing upstream of the two valve members 20, 22 in the fresh air system 5 as long as the pressure difference between the paths 6, 7 downstream of the valve members 20, 22 remains below a predefined limit value. As soon as this pressure difference reaches or exceeds the limit value, the control valve 43 connects the pressure space 40 to the atmospheric environment.

Figure 2:
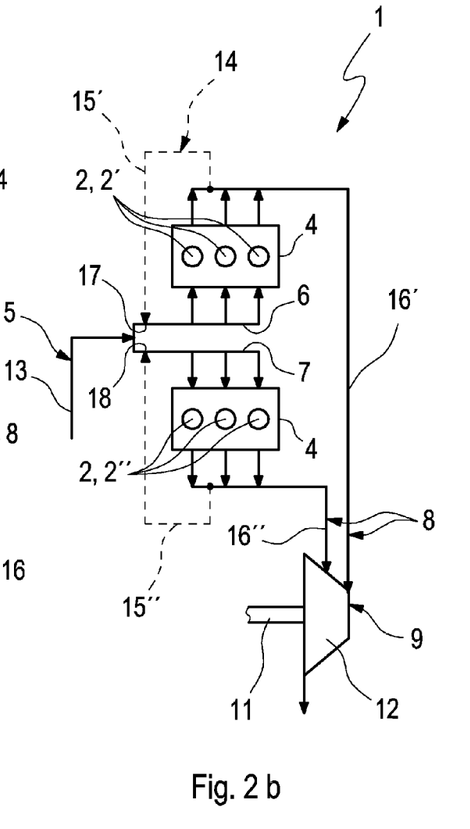

FIG. 7 represents a state with the internal combustion engine 1 switched off. The pressure $p_L$, upstream of the valve members 20, 22 then corresponds to the environmental pressure $p_U$. Correspondingly, the pressures in the pressure space 40 and in the counterpressure space 41 are equal, so that the restoring spring 42 can move the piston 38 to reduce the pressure space 40. Consequently, the control member 33 is pivoted into its open position. The connection opening 32 is open. During operation of the internal combustion engine 1, the pressure $p_L$, upstream of the valve members 20, 22 rises above the environmental pressure $p_U$ according to FIG. 8, if it is a charged internal combustion engine 1 as shown in FIGS. 1 and 2. Consequently, the pressure in the pressure space 40 also rises, as a result of which the piston 38 is driven to reduce the counterpressure space 41. In FIG. 8 the piston 38 has assumed a position in which it comes to bear against a stop 44. The restoring spring 42 is tensioned by the movement of the piston 38. During normal operation, the pressure difference between the two paths 6, 7 downstream of the valve members 20, 22 is below the predefined limit value so that the state shown in FIG. 8 is present. If a malfunction of the valve device 26 occurs, in which one of the paths 6, 7 is blocked, the pressure difference between the paths 6, 7 downstream of the valve members 20, 22 exceeds the said limit value. Consequently the control valve 43, the control inputs 45 of which are connected in a communicating manner to the paths 6, 7, is moved in such a manner that the pressure space 40 is connected to the environment. Consequently, the pressure space 40 is depressurised and the restoring spring 42 can move the piston 38 to reduce the pressure space 40. Consequently, the control member 33 is pivoted into the open position. The desired pressure equalisation is achieved between the paths 6, 7 in order to realise the emergency mode. As the pressure difference between the paths 6, 7 is equalised with the opening, it is expedient to provide a suitable mechanical lock for the control valve 43 too in order to connect the pressure space 40 permanently to the environment for the duration of the emergency mode.

In the embodiment shown in FIG. 7-10, the valve device 26 is expediently configured in such a manner that, when the drive member 27 fails, it assumes the position shown in FIG. 9, in which the first valve member 20 blocks the first path 6, whereas the second valve member 22 opens the second path 7, or vice versa.

Whereas in the embodiment shown in FIG. 7-10 the piston cylinder unit 36 is activated with the aid of the control valve 43, in the embodiment shown in FIGS. 11 and 12 the piston cylinder unit 36 is actuated passively. This is achieved in that the pressure space 40 is coupled fluidically to the first path 6, whereas the counterpressure space 41 is coupled fluidically to the second path 7. The pressure difference between the paths 6, thereby acts directly on the piston 38. A retaining device 48 fixes the closed position of the control member 33 so that the piston 38 is only moved when the limit value for the differential pressure between the paths 6, 7 is reached. The retaining device 48 also fixes the end positions which the piston 38 reaches when the pressure difference between the paths 6, 7 reaches or exceeds the limit value. This end position must be fixed to prevent the control member 33 from closing immediately after the pressure equalisation which occurs on opening. The restoring springs 42 are provided optionally. The embodiment shown in FIGS. 11 and 12 in particular allows different opening movements for the control member 33 depending on whether the first path 6 or the second path 7 is blocked by the malfunction of the valve device 26. In the exemplary embodiment of FIGS. 11 and 12, the control member 33 is realised as a flap, in particular as a centrally mounted butterfly flap which can be pivoted about a pivot axis 46. This pivot axis 46 extends perpendicularly to the main flow direction 24 and also perpendicularly to the rotation axis 25 of the valve members 20, 22. In contrast to this, the control member 33 in the embodiments of FIG. 2-6 is configured as a flap which is mounted about the pivot axis 46 in the region of an end edge.

According to FIG. 6-10, the fresh air system 5 can have a control member 33 provided in addition to the valve members 20, 22 in the fresh air tract 13 and in particular in the functional module 30. In the examples shown, this control member 33 corresponds to the control member 33 for controlling the connection opening 32. In principle, it can be a separate control member 33 which can in particular also be provided without the connection opening 32. This control member 33 is configured and/or arranged in such a manner that it can block one of the two paths 6, 7, in this case the second path 7. To this end, the control member 33 can be moved between an open position in which it opens the respective path 6, 7, and a blocking position in which it blocks the respective path 6, 7.

This blocking position is shown in FIGS. 6 and 10. As in this case the same control member 33 is used for controlling the connection opening 32 and for blocking one path 6, 7, the connection opening 32 is open when the control member 33 is in the blocking position.

To realise an engine braking mode or emergency shutdown of the internal combustion engine 1, a control device 29 can then be provided, which can in principle be the control device 29 for actuating the valve device 26. To perform an emergency shutdown of the internal combustion engine, the control device can on one hand actuate the control member 33 to block one path, in this case the second path 7, and on the other hand actuate the valve device 26 to block the other path, in this case the first path 6. Accordingly, the valve device 26 is in FIGS. 6 and 10 switched in such a manner that the first path 6 is permanently blocked with the aid of the first valve member 20. This interrupts the air supply of the internal combustion engine 1 via the two paths 6, 7. The internal combustion engine 1 shuts down owing to lack of air. To actuate the control member 33, a pneumatic piston cylinder unit 36 can again be provided, which can in principle be the piston cylinder unit 36 of the actuation device 35. It is likewise possible to provide a separate piston cylinder unit 36 or a differently configured actuator system. The respective piston cylinder unit 36 likewise again has a pressure space 40 which is delimited by a piston 38 drive-connected to the control member 33 and which can be loaded with the pressure prevailing in the fresh air system 5 upstream of the two valve members 20, 22. In the embodiment shown in FIG. 6, a control valve 49 can be actuated with the aid of the control device 29, in order to connect the control space 40 to the charge pressure $p_L$, whereas at the same time the counterpressure space 41 is connected to the environment. Consequently, the piston 38 drives the control member 33 to block the second path 7. In FIG. 6 a separate piston cylinder unit 36 is thus provided to realise the emergency shutdown.

In contrast to this, FIG. 7-10 show an embodiment in which the piston cylinder unit 36 of the actuation device 35 is used to realise the emergency shutdown. To this end, this piston cylinder unit 36 is equipped with the stop 44 which can be actuated electromagnetically. The stop 44 can be moved between an active position and a passive position with the aid of an electromagnetic actuator 47. In the currentless state, the stop 44 assumes the active position shown in FIG. 7-9, in which it limits the stroke of the piston 38. The actuator 47 can be supplied with current with the aid of the control device 29, as a result of which the stop 44 is moved into its passive position, which is shown in FIG. 10. As in this state the control valve 43 connects the control space 40 to the charge pressure $p_L$, the piston 38 can then be moved beyond the stop 44 to reduce the counterpressure space 41. The control member 33 pivots in the other direction, that is, into the second path 7 as far as the blocking position shown in FIG. 10. At the same time the control system 29 effects a blockage of the first path 6 by closing the first valve member 20. The internal combustion engine 1 consequently shuts down. When the internal combustion engine 1 shuts down, the charge pressure $p_L$, falls to the environmental pressure $p_U$. Consequently, the piston 38 can be moved back by the restoring force of the spring 42 to reduce the pressure space 40. The piston can for example be configured in such a manner that it (constructively) prevents the restoration of the stop 44 to prevent it from sticking in the emergency shutdown position. The valve member 33 drive-coupled in the process returns to the starting position. The same applies correspondingly to the embodiment according to FIG. 6 when the charge pressure $p_L$, falls to environmental pressure $p_U$ due to the shut down internal combustion engine 1.

Furthermore, a sensor system can be provided (not shown here) which for example monitors the conditions for opening the connection opening 32. For example, this sensor system can monitor the pressure difference between the two paths 6, 7. The sensor system can likewise monitor the position of the control member 33. As soon as the control member 33 opens the connection opening 32, this is detected by the sensor system. The sensor system can then generate a suitable error signal which can be scanned at a suitable point, for example in order to transmit a corresponding error message to a vehicle electronic system and/or to signal the presence of an error to a vehicle driver. It should in particular be possible to use the sensor system to realise an on board diagnostic system of the fresh air system 5.

The invention claimed is:

1. A dual path fresh air system, comprising:
    a first air supply path, wherein the first path supplies air to at least one first cylinder set;
    a second air supply path, wherein the second path supplies air to at least one second cylinder set;
    a first exhaust gas recirculation inlet fluidly connected to the first path to introduce recirculated exhaust gas into the first path;
    a second exhaust gas recirculation inlet fluidly connected to the second path to introduce recirculated exhaust gas into the second path;
    a first valve member, which is arranged upstream of the first exhaust gas recirculation inlet in the first path, wherein the first valve member controls fluid flowing through a cross section of the first path;
    a second valve member which is arranged upstream of the second exhaust gas recirculation inlet in the second path, wherein the second valve member controls fluid flowing through a cross section of the second path; and
    a valve device, which comprises the first valve member, the second valve member and a common drive member for the two valve members, wherein the two valve members are coupled in a phase-offset manner to the drive member such that one valve member at least one of minimizes and blocks the cross section through which fluid flows of one path whereas at the same time the other valve member at least one of maximizes and opens the cross section through which fluid flows of the other path, and vice versa.

2. The dual path fresh air system according to claim 1, wherein the valve members are at least one of used and actuated to set a desired exhaust gas recirculation rate, which depends on the current operating state of an internal combustion engine.

3. The dual path fresh air system according to claim 1, further comprising a functional module, which forms a dual path section of a fresh air tract, which conducts fresh air to the two valve members and the two exhaust gas recirculation inlets and is installed in the fresh air tract as a separate unit.

4. The dual path fresh air system according to claim 3, wherein the fresh air tract has a single path configuration as far as the functional module and a dual path configuration from the functional module, in the flow direction of the fresh air.

5. The dual path fresh air system according to claim 1, wherein at least one connection opening is formed in a partition, which separates the two paths from each other, the connection opening is controlled with a control member, which connects the two paths to each other in a communicating manner when the control member is in an open position and separates the two paths from each other when the control member is in a closed position.

6. The dual path fresh air system according to claim 5, wherein the connection opening is arranged at least one of upstream of the two exhaust gas recirculation inlets and downstream of the two valve members.

7. The dual path fresh air system according to claim 5, wherein the control member is actuated passively by a pressure difference occurring between the paths downstream of the two valve members such that the control member opens the connection opening when the pressure difference between the paths reaches a predefined limit value.

8. The dual path fresh air system according to claim 7, wherein the control member is prestressed into the closed position by spring force.

9. The dual path fresh air system according to claim 5, wherein an actuation device is provided for actuating the control member, the actuation device actuates the control member depending on the pressures in the paths downstream of the two valve members.

10. The dual path fresh air system according to claim 9, wherein the actuation device has a pneumatic piston cylinder unit which is drive-coupled to the control member.

11. The dual path fresh air system according to claim 1, further comprising a control member in addition to the valve members, the control member opens a path in an open position and blocks a the path in a blocking position.

12. The dual path fresh air system according to claim 11, further comprising a control device to at least one of realize an emergency shutdown of the internal combustion engine and an engine braking mode, actuates the control member to block one path and actuates the valve member allocated to the other path to block the other path.

13. The dual path fresh air system according to claim 11, further comprising a pneumatic piston cylinder unit for actuating the control member, the cylinder unit has a pressure space, which is delimited by a piston drive-connected to the control member, and which is loaded with the pressure prevailing in the fresh air system upstream of the two valve members.

14. The dual path fresh air system according to claim 11, further comprising an actuator for actuating the control member.

15. The dual path fresh air system according to claim 11, wherein the control member is arranged at least one of downstream of the valve members and upstream of the exhaust gas recirculation inlets.

16. The dual path fresh air system according to claim 5, further comprising a common control member, which in one position blocks the connection opening and opens a path and in the other position opens the connection opening and blocks a path.

17. The dual path fresh air system according to claim 16, wherein the control member is actuated depending on a pressure difference between the two paths to at least one of open and block the connection opening and open and block one path.

18. The dual path fresh air system according to claim 1, further comprising a sensor system which generates an error signal at least one of when the control member is actuated to open the connection opening and when the conditions for opening the connection opening are present.

19. A dual path fresh air system, comprising:
a first air supply path, wherein the first path supplies air to at least one first cylinder set;
a second air supply path, wherein the second path supplies air to at least one second cylinder set;
a first exhaust gas recirculation inlet fluidly connected to the first path to introduce recirculated exhaust gas into the first path;
a second exhaust gas recirculation inlet fluidly connected to the second path to introduce recirculated exhaust gas into the second path;
a first valve member, which is arranged upstream of the first exhaust gas recirculation inlet in the first path, wherein the first valve member controls fluid flowing through a cross section of the first path;
a second valve member which is arranged upstream of the second exhaust gas recirculation inlet in the second path, wherein the second valve member controls fluid flowing through a cross section of the second path;
at least one connection opening is formed in a partition, which separates the two paths from each other, the connection opening is controlled with a control member, which connects the two paths to each other in a communicating manner when the control member is in an open position and separates the two paths from each other when the control member is in a closed position;
an actuation device for actuating the control member, the actuation device actuating the control member depending on the pressures in the paths downstream of the two valve members, the actuation device including:
a pneumatic piston cylinder unit which is drive-coupled to the control member, and
a control valve which actuates the piston cylinder unit depending on a differential pressure between the paths downstream of the two valve members such that control valve loads a pressure space of the piston cylinder unit with the pressure prevailing in the fresh air system upstream of the two valve members as long as the differential pressure remains below a predefined limit value, and that the control valve loads the pressure space with atmospheric environmental pressure as soon as the pressure difference at least one of reaches and exceeds the predefined limit value.

20. A dual path fresh air system, comprising:
a first air supply path, wherein the first path supplies air to at least one first cylinder set;
a second air supply path, wherein the second path supplies air to at least one second cylinder set;
a first exhaust gas recirculation inlet fluidly connected to the first path to introduce recirculated exhaust gas into the first path;
a second exhaust gas recirculation inlet fluidly connected to the second path to introduce recirculated exhaust gas into the second path;
a first valve member, which is arranged upstream of the first exhaust gas recirculation inlet in the first path, wherein the first valve member controls fluid flowing through a cross section of the first path;
a second valve member which is arranged upstream of the second exhaust gas recirculation inlet in the second path, wherein the second valve member controls fluid flowing through a cross section of the second path;
a control member in addition to the valve members, wherein the control member opens a path in an open position and blocks the path in a blocking position;
a control device to at least one of realize an emergency shutdown of the internal combustion engine and an engine braking mode, wherein the control device actuates the control member to block one path and actuates the valve member allocated to the other path to block the other path; and a pneumatic piston cylinder unit for actuating the control member, wherein the piston cylinder unit has a stop, which is actuated electromagnetically to limit the stroke of a piston, and when the stop is actuated by the control device allows the piston to move, which makes it possible for the control member to move into its blocking position to block one path.

* * * * *